United States Patent
Saunders (10) Patent No.: US 7,181,408 B2
(45) Date of Patent: Feb. 20, 2007

(54) LIVESTOCK PRICING SYSTEM

(75) Inventor: John Saunders, Platte City, MO (US)

(73) Assignee: Integrated Management Information, Inc., Castle Rock, CO (US)

( * ) Notice: Subject to any disclaimer, the term of this patent is extended or adjusted under 35 U.S.C. 154(b) by 211 days.

(21) Appl. No.: 10/462,169

(22) Filed: Jun. 16, 2003

(65) Prior Publication Data

US 2004/0254800 A1 Dec. 16, 2004

(51) Int. Cl.
*G06Q 99/00* (2006.01)

(52) U.S. Cl. .............................. 705/1; 705/14; 705/26; 705/37

(58) Field of Classification Search .................... 705/1, 705/7, 37, 14
See application file for complete search history.

(56) References Cited

U.S. PATENT DOCUMENTS

| | | | | | |
|---|---|---|---|---|---|
| 3,281,821 | A | * | 10/1966 | Joy | 340/323 R |
| 5,457,627 | A | * | 10/1995 | Cureton et al. | 705/34 |
| 6,871,191 | B1 | * | 3/2005 | Kinney et al. | 705/37 |
| 2001/0047308 | A1 | * | 11/2001 | Kaminsky et al. | 705/26 |
| 2002/0007338 | A1 | * | 1/2002 | Do | 705/37 |
| 2002/0065765 | A1 | * | 5/2002 | Shuler et al. | 705/37 |
| 2002/0165771 | A1 | * | 11/2002 | Walker et al. | 705/14 |
| 2002/0169703 | A1 | * | 11/2002 | Lutnick et al. | 705/37 |
| 2003/0014325 | A1 | * | 1/2003 | Biffar et al. | 705/26 |
| 2003/0023538 | A1 | * | 1/2003 | Das et al. | 705/37 |
| 2003/0158773 | A1 | * | 8/2003 | Brunner | 705/10 |
| 2003/0177025 | A1 | * | 9/2003 | Curkendall et al. | 705/1 |
| 2003/0204408 | A1 | * | 10/2003 | Guler et al. | 705/1 |
| 2003/0204465 | A1 | * | 10/2003 | Marhafer et al. | 705/37 |

FOREIGN PATENT DOCUMENTS

JP 61103326 A * 5/1986

OTHER PUBLICATIONS

Abraham, Chuck, "eMerge Interactive's CattleinfoNet Hosts Record-Breaking Online Cattle Auction" and "Grid Pricing As A Fed Cattle Marketing Strategy", Jan. 29, 2001, PR Newswire. New York. 3 pgs.*

(Continued)

*Primary Examiner*—John W. Hayes
*Assistant Examiner*—Freda A. Nelson
(74) *Attorney, Agent, or Firm*—Hovey Williams LLP (57) ABSTRACT

A livestock pricing system (10) broadly comprises a processor (14) to predict a best price for a group of animals, a grid database (16) to store price information used to predict the best price, a livestock database (18) to store livestock specifications used to compare with the price information to predict the best price, and an authenticator (20) to authenticate a plurality of users of the system (10) and thereby control user's access to the price information and livestock specifications stored in the databases (16,18). The system (10) also preferably includes a network adapter (22) to connect the system (10) to a network (12) through which the system (10) may be accessed by the users, which includes buyers and sellers. The system (10) compares several individual prices from each buyer to predict which buyer would cumulatively pay the best price.

5 Claims, 5 Drawing Sheets

OTHER PUBLICATIONS

DiConstanzo et al. "Grid Pricing As A Fed Cattle Marketing Strategy", 2000 Minnesota Cattle Feed Report B-470, 15 pgs.*

Gordon, Pat, "Video cattle sales find niche in traditional auction market", Nov. 22, 1998, Boston Globe, pg. A. 14, 3 pgs.*

Miller, Dale, "Beef Cattle Marketing In North Carolina: A General Summary", Aug./Sep. 1995, North Carolina State university, Animal Husbandry Newsletter, 4 pgs.*

Dill, DeWayne Edward, Ph.D., "An electronic model for determining value and predicting sale price of Holstein cattle sold at public auction", Sep. 1990, Dissertation, University of Illinois at Urbana-Champaign, abstract, 1 pg.*

Richards, Bill, "Rounding Up Dollars: Emerge chooses the Web to auction cattle, reducing inefficiencies" Jun. 12, 2000, Wall Street Journal, p. 16, 5 pgs.*

Feuz et al., "Fed Cattle Pricing", Jun. 1998, NebGuide, 5 pgs.*

Donnelly et al., "Cases in Strategic-Systems Auditing", Apr. 2002, KPMG/University of Illinois, 23 pgs.* http://mastermaketer.tamu.edu/factsheets/rm1-11oh.pdf; Risk Management Education—Fed Cattle Grid Pricing Curriculum Guide and Fed Cattle Pricing Methods; Dec. 1998.

* cited by examiner

FIG. 1

| Grade | Yield ($/cwt. carcass) | | | | |
|---|---|---|---|---|---|
| | 1 | 2 | 3 | 4 | 5 |
| Prime | 8 | 7 | 6 | -9 | -14 |
| CAB | 3 | 2 | 1 | X | X |
| Choice | 2 | 1 | BASE | -15 | -20 |
| Select | -7 | -8 | -9 | -24 | -29 |
| Standard | -16 | -17 | -18 | -33 | -38 |

| CARCASS WEIGHTS | |
|---|---|
| <550lbs | -19 |
| 550-749lbs | BASE |
| 750-950lbs | -4 |
| >950lbs | -19 |

| OTHER | |
|---|---|
| Dark | -25 |
| Cutter | -25 |
| Bullock | -25 |
| Stag | -25 |

Price Grid #1

FIG. 2

| Grade | 1 | 2 | Yield 3 ($/cwt. carcass) | 4 | 5 |
|---|---|---|---|---|---|
| Prime | 10 | 8 | 6 | -6 | -12 |
| CAB | 4 | 2 | 1 | X | X |
| Choice | 3 | 1 | BASE | -12 | -17 |
| Select | -6 | -8 | -10 | -21 | -25 |
| Standard | -14 | -16 | -18 | -30 | -35 |

| CARCASS WEIGHTS | | OTHER | |
|---|---|---|---|
| < 550lbs | -17 | Dark | -25 |
| 550-749lbs | BASE | Cutter | -25 |
| 750-950lbs | -3 | Bullock | -25 |
| > 950lbs | -17 | Stag | -25 |

Price Grid #2

FIG. 3

| Grade | 1 | 2 | Yield 3 ($/cwt. carcass) | 4 | 5 |
|---|---|---|---|---|---|
| Prime | 7 | 6 | 5 | -6 | -12 |
| CAB | 3 | 2 | 1 | X | X |
| Choice | 2 | 1 | BASE | -12 | -17 |
| Select | -6 | -8 | -10 | -21 | -25 |
| Standard | -14 | -16 | -18 | -30 | -35 |

| CARCASS WEIGHTS | | OTHER | |
|---|---|---|---|
| < 550lbs | -18 | Dark | -25 |
| 550-749lbs | BASE | Cutter | -25 |
| 750-950lbs | -3 | Bullock | -25 |
| > 950lbs | -18 | Stag | -25 |

Price Grid #3

LIVESTOCK PRICING SYSTEM

BACKGROUND OF THE INVENTION

1. Field of the Invention

The present invention relates to pricing systems. More particularly, the present invention relates to a livestock pricing system that can compare specifications of each of a group of animals with price information from a plurality of buyers in order to predict a best price for the animals.

2. Description of Prior Art

The United States beef industry produced over 26.7 billion pounds of beef with a retail value of over $58.6 billion and United States consumers consumed 69.5 lbs. of beef at a cost of $213 per capita in the year 2000. Such an industry is comprised of millions of sales transactions each day.

For each transaction, beef producers must decide to whom to sell their livestock. With the large number of buyers in this industry, deciding which buyer will pay a best price has become a daunting task. This task can be particularly difficult when producers or sellers have many different animals and different buyers who use different pricing schemes. While many standardized pricing schemes have been introduced, such as grid pricing, these schemes involve many complex calculations. In addition, failure to communicate changes in such price schemes may lead to errors and inefficiencies.

For example, deciding to which buyer a particular seller should sell involves many calculations based upon specifications of livestock that seller has for sale. These calculations themselves can be quite difficult and wholly dependant upon price information from buyers. If such calculations are based upon old and inaccurate price information, sellers not only waste their time, but also miss out on more lucrative sales.

Accordingly, there is a need for an improved livestock pricing system that overcomes the limitations of the prior art.

SUMMARY OF THE INVENTION

The present invention overcomes the above-identified problems and provides a distinct advance in the art of pricing systems. More particularly, the present invention provides a livestock pricing system that can compare livestock specifications of each of a group of animals with price information from a plurality of buyers in order to predict a best price for the animals. The preferred livestock pricing system broadly comprises a processor to predict the best price, a grid database to store the price information used to predict the best price, a livestock database to store the specifications used to compare with the price information to predict the best price, and an authenticator to authenticate a plurality of users of the system and thereby control each user's access to the price information and specifications stored in the databases. The system also preferably includes a network adapter to connect the system to a network through which the system may be accessed by the users, such as buyers and sellers.

The price information includes price grids and base prices. The price grids reflect how differences between a nominal animal, with nominal specifications, and any given animal, with given specifications, are used to modify the base price in order to predict the best price. The price grids preferably comprise premiums and discounts which may be different for each of the buyers. For example, a first buyer may utilize a first price grid, a second buyer may utilize a second price grid, and a third buyer may utilize a third price grid.

The base price may be common among many buyers or different for each buyer. For example, each buyer may use a first base price of $105/(one hundred pounds or cwt). Alternatively, the first buyer may use the first base price, while the second buyer uses a second base price of $102/cwt and the third buyer uses a third base price of $103/cwt.

With previous methods, the sellers typically had a difficult time predicting which buyer would pay the best price. This task can be particularly difficult when the sellers have many different animals, many different buyers to choose from, and/or the buyers use different price information. For example, the first buyer, using the first price grid and the first base price, may pay $105/cwt for a first animal, provided the first animal meets the nominal specifications. Additionally, the second buyer, using the second price grid and the second base price, may pay $102/cwt for the first animal. In this case, with all other considerations being equal, the seller would prefer to sell the first animal to the first cattle buyer.

However, the first buyer may pay only $77/cwt for a second animal, with different specifications, while the second buyer may pay $78/cwt for the second animal. In this case, the seller would prefer to sell the second animal to the second buyer. Similar calculations must be made for each animal the seller has for sale. As a result, the calculations may suggest that each animal should be sold to a different buyer. However, the seller typically prefers to sell his or her animals in groups to a single buyer, or a limited number of buyers, for efficiency and simplicity. Thus, the question becomes, "which buyer will pay the best price for both animals, or a particular group of animals?" For example, the first buyer may pay $1351 for both animals, while the second buyer may pay $1338 for both animals. Obviously, the seller would prefer to sell both animals to the first buyer. Such price differences are magnified as more animals are being sold.

It should be obvious that some of the animals may need to be sold at less than they may bring individually. Specifically, the seller can get more for animal number two, if sold to the second buyer. However, the group of both animals will bring the best price from the first buyer. The seller may choose to minimize this inefficiency by deciding to sell his or her animals to two or more buyers.

For example, the seller may prefer to split a large group of animals among two buyers. In this case, the system preferably decides to which seller each animal should be sold. For instance, the system compares each animal's individual price for each buyer, predicts which two buyers would cumulatively pay the best price, and then allocates each animal to each of the two buyers in order to obtain the best price.

As the group of animals gets larger and more buyers are available to purchase the animals, these calculations become very complicated. In addition, buyers frequently change their price grid, their base price, or both, thereby requiring the sellers to constantly update the price information used. To make matters worse, the sellers may not even know when any of the buyers have changed one of the price grids or one of the base prices.

In contrast, the system of the present invention provides a common site that may be used by both buyers and sellers. For example, the buyers can provide their most recent price information and thereby inform all of the sellers of the most recent price information. This allows the sellers to rest assured that they have access to the most recent price information, thereby allowing the sellers to spend more time managing their businesses.

Since the sellers may use the system to store the specifications, the sellers may also use the system to track development of their animals. For example, the livestock database may be configured to store recently entered specifications without deleting previously entered specifications. In this manner, records for a particular seller may contain may dated sets of specifications for a particular group of animals. This allows the seller to compare the sets of specifications and monitor or track the particular group's progress or development. In this regard, the system may be used in conjunction with other information management systems, such as that disclosed in the patent application entitled "INFORMATION SYSTEM AND METHOD FOR GATHERING INFORMATION RELATING TO LIVESTOCK", Ser. No. 10/278,876, Filed on Oct. 22, 2002, incorporated herein by reference.

In use, the buyers provide their most recent price information, which is stored in the grid database. The sellers may update the livestock specifications stored in the livestock database, as desired. With updated livestock specifications, any of the sellers may direct the system to compare his or her livestock specifications to the price information. The system predicts the best price and which buyer will pay the best price for the seller's animals. At this point the seller may access contact information for the buyer that will pay the best price in order to complete a sales transaction offline or may complete the transaction online.

Alternatively, the seller may choose to first split his or her animals into two or more groups. The seller may manually decide which animal is allocated to which group, using the individual prices provided by the system. However, the system preferably allocates the animals among the groups to produce the best price. For example, if the seller decided to split his or her animals into two groups, the system automatically compares each individual price, by animal and by buyer, in order to find which two buyers will pay the best price for the seller's animals and which animal should be sold to each buyer.

BRIEF DESCRIPTION OF THE DRAWINGS

A preferred embodiment of the present invention is described in detail below with reference to the attached drawing figures, wherein.

DETAILED DESCRIPTION OF A PREFERRED EMBODIMENT

Figure 1:
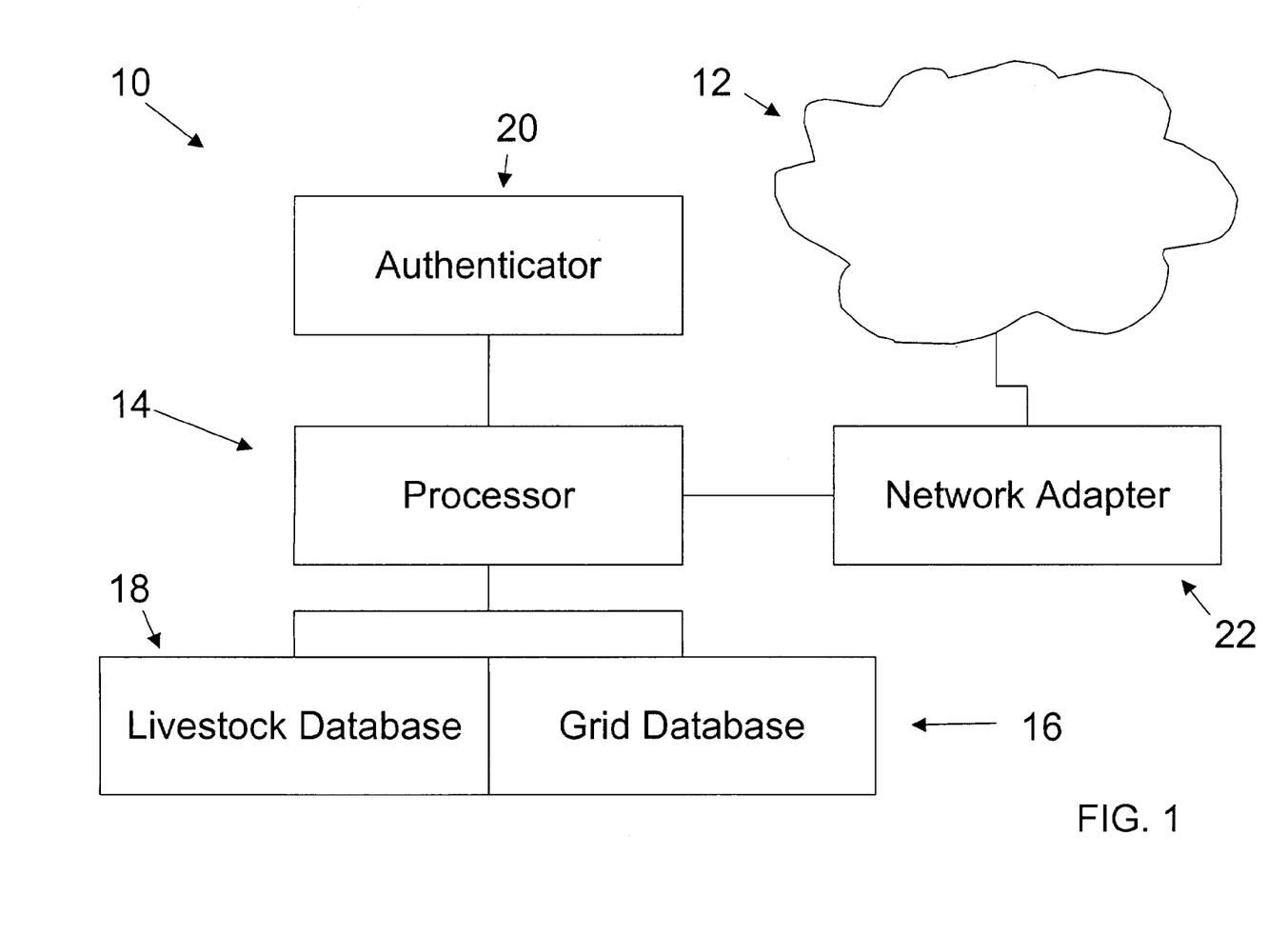
FIG. 1 is a block diagram view of a livestock pricing system of the present invention.

Referring to FIG. 1, the preferred livestock pricing system 10 constructed in accordance with a preferred embodiment of the present invention is illustrated connected to a network 12. The system 10 broadly comprises a processor 14 operable to predict a best price for a group of animals, a grid database 16 operable to store price information used to predict the best price, a livestock database 18 operable to store livestock specifications to compare with the price information to predict the best price, and an authenticator 20 operable to authenticate a plurality of users of the system 10 and thereby control each user's access to the price information and specifications stored in the databases 16,18. The system 10 also preferably includes a network adapter 22 to connect the system 10 to the network 12 through which the system 10 may be accessed by the users, such as buyers and sellers.

The network 12 is preferably an Internet based communications network that spans a large geographical area making the network 12 accessible to a large number of users. As such, the network 12 may simply be the Internet itself or may comprise a virtual private network utilizing the Internet. Alternatively, the network 12 may be an independent wide area network (WAN) or even a local area network (LAN).

The processor 14, the databases 16,18, the authenticator 20, and the network adapter 22 may be implemented across many individual servers or conventional personal computers, such as those available from Gateway and Hewlett Packard. Alternatively, the system 10 may be implemented in one server, such as those available from Dell, IBM, and Compaq. The databases 16,18 preferably utilize a conventional database engine, such as Oracle, Sybase, or Microsoft SQL Server. The databases 16,18 may be implemented in completely separate storage mediums or in a common storage medium. While the databases 16,18 are preferably configured as independent applications, they may actually be configured as a common application storing both records for the price information and records for the specifications.

The authenticator 20 identifies each user through common network security techniques, such as by receiving a username and a password from each user. The authenticator 20 confirms each user's identity by matching the username and the password with one the records in an appropriate one of the databases 16,18 and prevents the users from accessing data to which they have not been given access. For example, if a particular user authenticates as one of the buyers, then the record associated with that particular user is preferably stored in the grid database and that particular user's access is preferably limited to the price information stored in his or her record. Alternatively, if a particular user authenticates as one of the sellers, then the record associated with that particular user is preferably stored in the livestock database and that particular user may access and update the specifications stored in his or her record, as well as compare the specifications to the price information to which he or she has been given access.

It is important to note that it is anticipated that each seller will be given read-access to all available price information. However, each seller's access may be restricted by any of the buyers, that seller, an administrator of the system 10, or any combination thereof. For example, one of the users may decide that they do not wish to do business with one of the other users. Additionally, access to the system 10 is anticipated to be managed as a subscription service. Thus, access to the price information may be modified by the administrator according to access rights acquired through the subscription service.

The price information includes price grids and base prices. The price grids reflect how differences between a nominal animal, with nominal specifications, and any given animal, with given specifications, are used to modify the base price in order to predict the best price. More specifically, referring to FIGS. 2–4, the price grids preferably comprise premiums and discounts that modify the base price. Each price grid is preferably provided by a different one of the buyers. For example, a first buyer may utilize a first price grid, such as that shown in FIG. 2, a second buyer may utilize a second price grid, such as that shown in FIG. 3, and a third buyer may utilize a third price grid, such as that shown in FIG. 4. However, any buyer may utilize more than one price grid, depending upon each buyer's goals.

Figure 2:
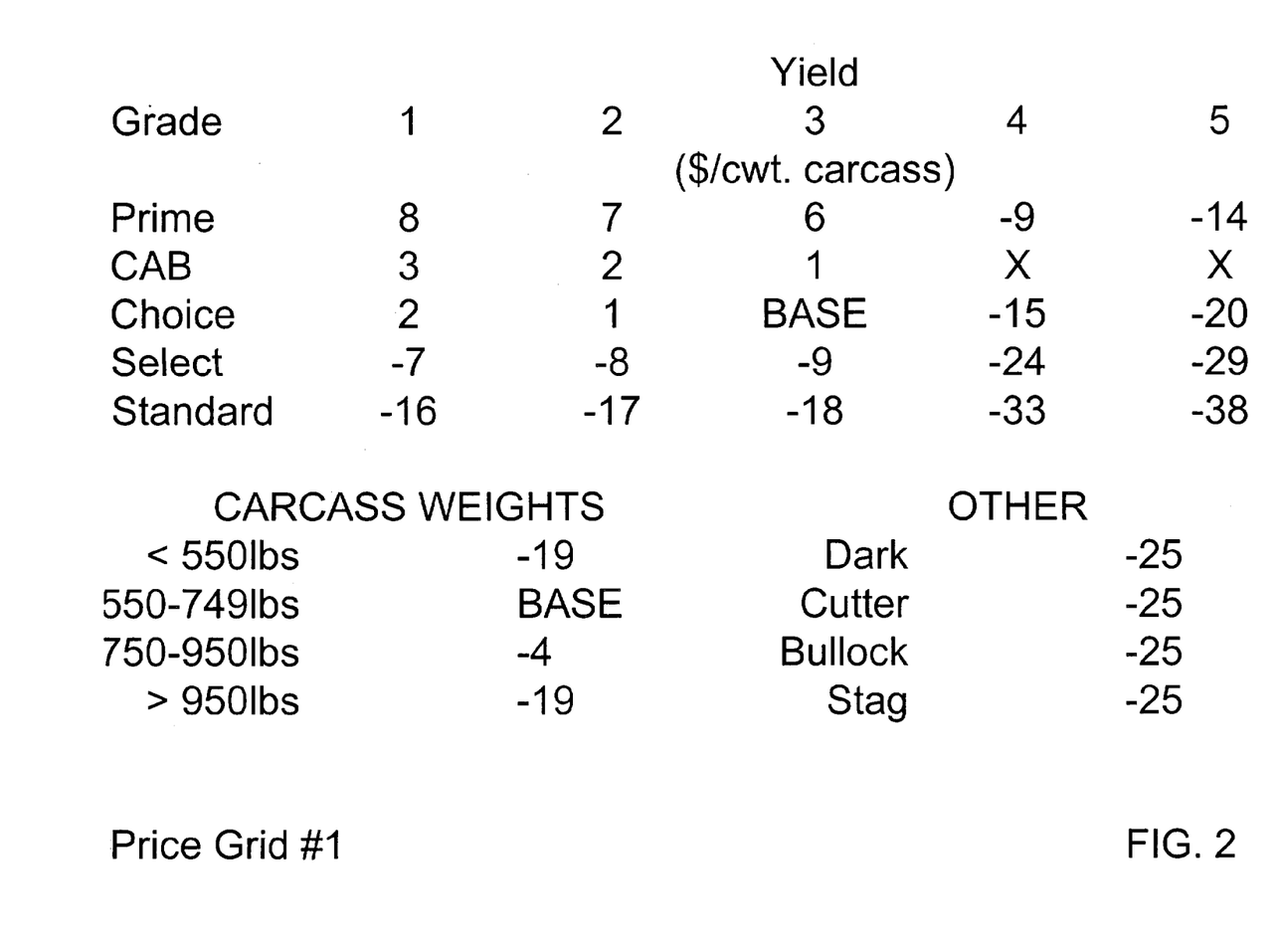
FIG. 2 is a first price grid for use with the system.
Figure 3:
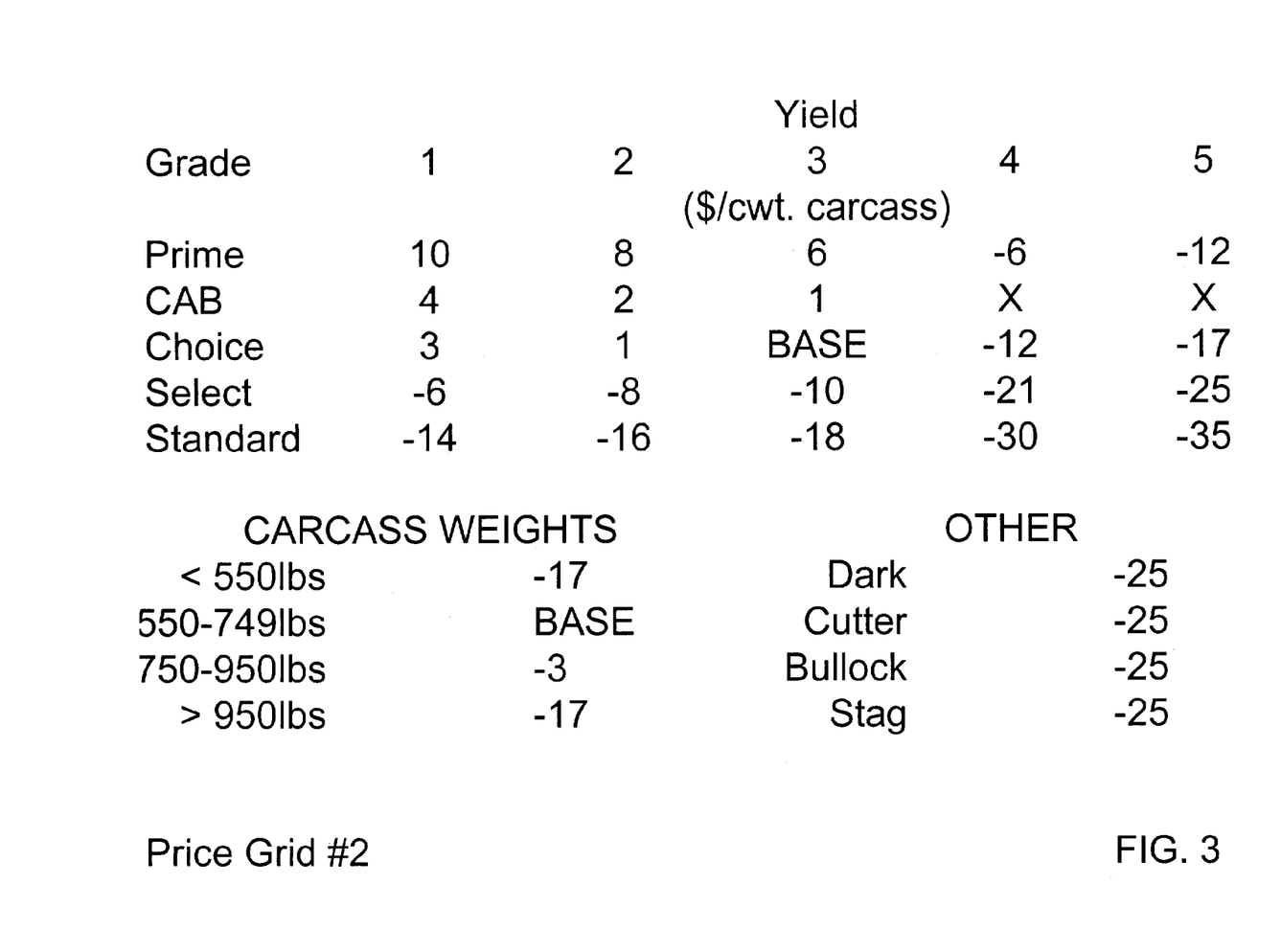
FIG. 3 is a second price grid for use with the system.
Figure 4:
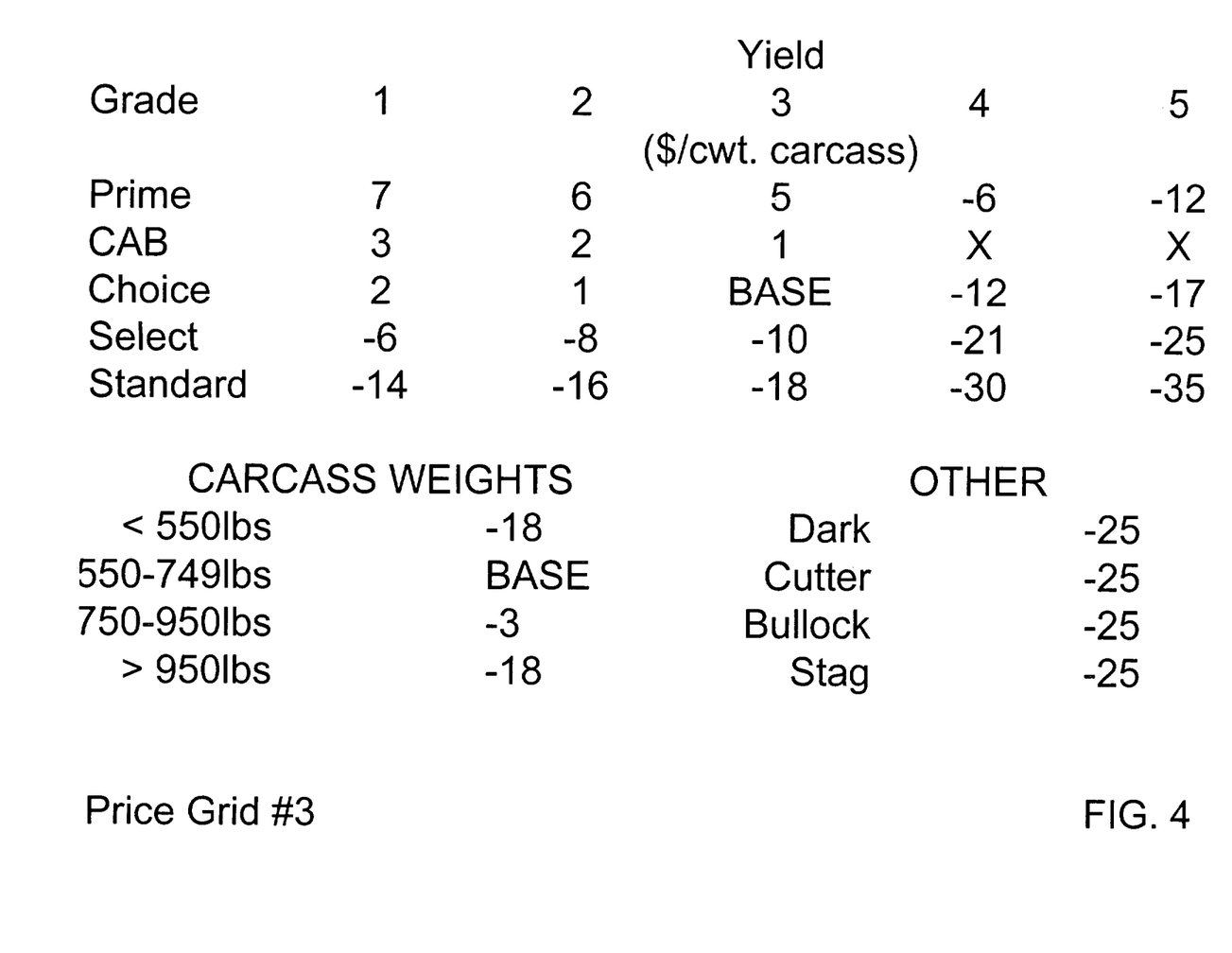
FIG. 4 is a third price grid for use with the system.

Similarly, the base price may be common among many buyers or different for each buyer. For example, all of the buyers may use a first base price of $105/cwt. Alternatively, the first buyer may use the first base price, while the second buyer uses a second base price of $102/cwt and the third buyer uses a third base price of $103/cwt.

With previous methods, the sellers typically had a difficult time predicting which buyer would pay the best price. This task can be particularly difficult when the sellers have many different animals, many different buyers to choose from, and/or the buyers use different price information. For example, suppose the seller has ten animals, as described in Table 1. Given the price grids of FIGS. 2–3, predicting which buyer will pay the best price involves many calculations.

TABLE 1

Animal Specifications

| Animal Number | Grade | Yield | Weight |
| --- | --- | --- | --- |
| 1 | Choice | 3 | 700 lbs |
| 2 | Select | 4 | 800 lbs |
| 3 | CAB | 2 | 650 lbs |
| 4 | Standard | 1 | 500 lbs |
| 5 | Prime | 5 | 580 lbs |
| 6 | CAB | 3 | 650 lbs |
| 7 | Standard | 4 | 780 lbs |
| 8 | Select | 2 | 975 lbs |
| 9 | Choice | 5 | 875 lbs |
| 10 | Prime | 1 | 900 lbs |

For example, the first buyer, using the first price grid and the first base price, would pay $105/cwt for animal number one. Since animal number one falls within a nominal range, the $105/cwt price is simply the base price. Additionally, the second buyer, using the second price grid and the second base price, would pay $102/cwt for animal number one. Thus, the seller would prefer to sell animal number one to the first buyer.

However, the first buyer, using the first price grid and the first base price, would pay only $77/cwt for animal number two. The $77/cwt price is the $105/cwt base price minus 24 for Select grade 4 and minus 4 for weighing between 750 and 900 lbs. The second buyer, using the second price grid and the second base price, would pay $78/cwt, for animal number two. The $78/cwt price is the $102/cwt base price minus 21 for Select grade 4 and minus 3 for weighing between 750 and 900 lbs. Obviously, the seller would prefer to sell animal number two to the second buyer. Similar calculations must be made for each of the ten animals of Table 1.

As discussed above, the calculations may suggest that each animal should be sold to a different buyer. However, the seller typically prefers to sell his or her animals in groups to a single buyer, or a limited number of buyers, for efficiency and simplicity. Thus, the question becomes, "which buyer will pay the best price for a group of animals?" For example, the first buyer, using the first price grid and the first base price, would pay $1351 for animals number one and two, which is $735 for animal number one plus $616 for animal number two. The second buyer, using the second price grid and the second base price, would pay $1338 for animals number one and two, which is $714 for animal number one plus $624 for animal number two. Obviously, the seller would prefer to sell the group of animals number one and two to the first buyer.

By way of a slightly more involved example, suppose one of the sellers would like to sell all ten animals specified in Table 1 to one of the three buyers discussed above. Table 2 details an individual price that each animal is expected to bring from each of the buyers and a total price for the group from each of the buyers. While there is a relatively large difference between the total price the seller may expect from the first buyer and the second buyer, there is a relatively small difference between the total price the seller may expect from the first buyer and the third buyer. Using only the information presented here, the seller is likely to choose to sell his or her animals to the first buyer.

TABLE 2

Animal prices (in $) using various base prices

| Animal Number | Grid #1 $105/cwt | Grid #2 $102/cwt | Grid #3 $103/cwt |
| --- | --- | --- | --- |
| 1 | 735.00 | 714.00 | 721.00 |
| 2 | 616.00 | 624.00 | 632.00 |
| 3 | 695.50 | 676.00 | 682.50 |
| 4 | 350.00 | 355.00 | 355.00 |
| 5 | 527.80 | 522.00 | 527.80 |
| 6 | 689.00 | 669.50 | 676.00 |
| 7 | 530.40 | 538.20 | 546.00 |
| 8 | 672.75 | 672.75 | 672.75 |
| 9 | 708.75 | 717.50 | 726.25 |
| 10 | 981.00 | 981.00 | 963.00 |
| Total | 6506.02 | 6469.95 | 6502.30 |

However, using side-by-side comparisons such as that provided by the system 10 and presented in Table 2, the seller may make an even more informed decision. For example, the third buyer may be closer to the seller, the third buyer may be easier to deal with, or the seller may simply prefer to do business with the third buyer. While such issues may not make good business sense, when dealing with large price differences, when dealing with relatively small price differences such issues may be significant. Thus, the system 10 of the present invention provides a tool to simplify calculations, thereby allowing the sellers to quickly and easily make informed decisions.

It should be obvious that some of the animals may need to be sold at less than they may bring individually, as illustrated above. Specifically, the seller can get more for animal number two, if sold to either the second buyer or the third buyer. However, the group, as a whole, will bring the best price from the first buyer. The seller may choose to minimize this inefficiency by deciding to sell his or her animals to two or more buyers.

For example, the seller may prefer to sell the group of Table 1 to two of the buyers discussed above. In this case, the seller is likely to choose the sell his or her animals to the first and third buyers. While many of the animals would yield a higher price with either the first or third buyer, animals number five and eight would yield identical prices from both the first and third buyers. In this case, the seller will decide to which buyer animals number five and eight will be sold depending on other factors, such as those discussed above. Table 3 assumes that the seller would prefer to sell animals number five and eight to the third buyer.

TABLE 3

Animal prices (in $) using various base prices

| Animal Number | Grid #1 $105/cwt | Grid #3 $103/cwt |
|---|---|---|
| 1 | 735.00 | |
| 2 | | 632.00 |
| 3 | 695.50 | |
| 4 | | 355.00 |
| 5 | | 527.80 |
| 6 | 689.00 | |
| 7 | | 546.00 |
| 8 | | 672.75 |
| 9 | | 726.25 |
| 10 | 981.00 | |
| Total | 3100.50 | 3459.80 |
| Grand Total | | 6560.30 |

As shown in Table 3, selling the group of animals of Table 1 to two buyers may yield a relatively large price difference when compared with selling the group to one buyer. It is important to realize that sellers typically work with much larger groups than that shown in Table 1 and the price differences discussed above are typically magnified as the size of the group is increased.

As the group of animals gets larger and more buyers are available to purchase the animals, these calculations become very complicated. In addition, buyers frequently change their price grid, their base price, or both, thereby requiring the sellers to constantly update the price information used. To make matters worse, the sellers may not even know when any of the buyers have changed one of the price grids or one of the base prices.

In contrast, the system 10 of the present invention provides a common site that may be used by both buyers and sellers. For example, the buyers may provide their most recent price information and thereby inform all of the sellers of the most recent price information. This allows the sellers to rest assured that they have access to the most recent price information, thereby allowing the sellers to spend more time managing their businesses.

Since the sellers may use the system 10 to store the specifications, the sellers may also use the system 10 to track development of their animals. For example, the livestock database 18 may be configured to store recently entered specifications without deleting previously entered specifications. In this manner, the records for a particular seller may contain many dated sets of specifications for a particular group of animals. This allows the seller to compare the sets of specifications and monitor or track the particular group's progress or development. In this regard, the system 10 may be used in conjunction with other information management systems.

While predicting the best price has been described above as based primarily on the base prices and price grids, other factors may also be incorporated. For example, the best price may account for freight charges. In this regard, the grid database 16 may contain more information about the buyers, such as the buyer's location and/or other contact information. Similarly, the livestock database 18 may contain more information about the sellers, such as the seller's location and/or other contact information. Therefore, the processor 14 can calculate a distance between each buyer and seller. While the distance may be a straight line distance, the distance is preferably a route distance from the seller to the buyer over road, rail, or other transportation lines. The processor 14 determine each freight charge by simply multiplying the distance by a fixed freight rate.

Accounting for the freight charge may be even more advanced. For example, the processor 14 may obtain a variable freight rate from either one of the databases 16,18 or from other sources. Additionally, the processor 14 may determine how many loads will be needed, depending upon a number of animals to be sold.

For example, suppose a particular seller at a first location was contemplating selling eighty-five animals to a particular buyer at a second location. The processor 14 may determine that only a specific transporter was available to service both locations, that the specific transporter used trucks capable of holding no more than forty animals each, that the specific transporter was currently charging $1 per mile per truck, and that the route distance between the locations was 350 miles. In this case, the processor 14 would determine the freight charge to be $1050, which is 350 miles multiplied by the $1 freight rate and three required trucks. The system 20 may account for the freight charge by deducting the freight charge from the best price from each buyer. The freight charge may be significant enough to make it more profitable for the seller to sell his or her animals to a different one of the buyers, who may not otherwise pay the best price. Thus, factors, such as freight charges, may also be accounted for and may influence the best price.

The contact information also allows the sellers to contact the buyers to arrange for and complete a sales transaction offline. Alternatively, the system 10 may allow the buyers and sellers to arrange for and/or complete the transaction online. For example, the system 10 may provide a method of communicating details of the transaction, thereby facilitating arrangement of the transaction. Furthermore, the system 10 may include actual online commerce, wherein the sales transaction occurs and funds are transferred online. This feature may also be used to facilitate the transaction by allowing the buyers to pay for freight and/or other charges. However, online commerce is expected to only be used between trusted buyers and sellers, since several factors, such as the seller's ability to properly rate their animals may have significant impact on the best price.

It should be noted that the price information described herein preferably refers to premiums, discounts, and base prices paid by particular buyers during a previous week. In this regard, the system 10 preferably only displays the individual prices, the total prices, and the best price for those buyers who have provided the price information from the previous week. Alternatively, the system 10 may display old price information, provided the system 10 informs the sellers of applicable dates for such information. Furthermore, the system 10 may display both old price information and the most recent price information, in order to show pricing trends.

While the present invention has been described above, it is understood that substitutions may be made. For example, while the system 10 is anticipated to be used with cattle, the system 10 may be used with other forms of livestock, such as sheep, swine, or poultry. Additionally, the sellers need not enter specifications for each animal. For example, the sellers may enter only specifications for a representative animal from each of a plurality of groups. While the system 10 may loose some accuracy with this modification, the system 10 will be much easier to use with several very large groups. The buyers may update their own price information or such activity may be restricted such that the buyers actually have little or no access to the system 10, leaving the administrator with the responsibility of updating the price information. In either case, the buyers may subscribe to and maintain a fictional seller account, thereby allowing the buyers to view, but not change, price information of other buyers. While specific premiums and discounts have been described herein, other premiums and discounts may be used. Furthermore, the sellers may also compare prices from the buyers with a cash price, which is preferably an average of cwt prices paid the previous week and does not account for premiums and discounts or individual animal specifications. Finally, the system 10 may provide a report detailing the best price, the price grid that yielded the best price, and/or the contact information for the buyer or buyers that are expected to pay the best price. Alternatively, the system 10 may provide this information in another manner. For example, the system 10 may provide this information in graphs, charts, or other formats. The report may also present alternatives to the best price, such as a second best price or a result of splitting the seller's animals into two or more group. These and other minor modifications are within the scope of the present invention.

Figure 5:
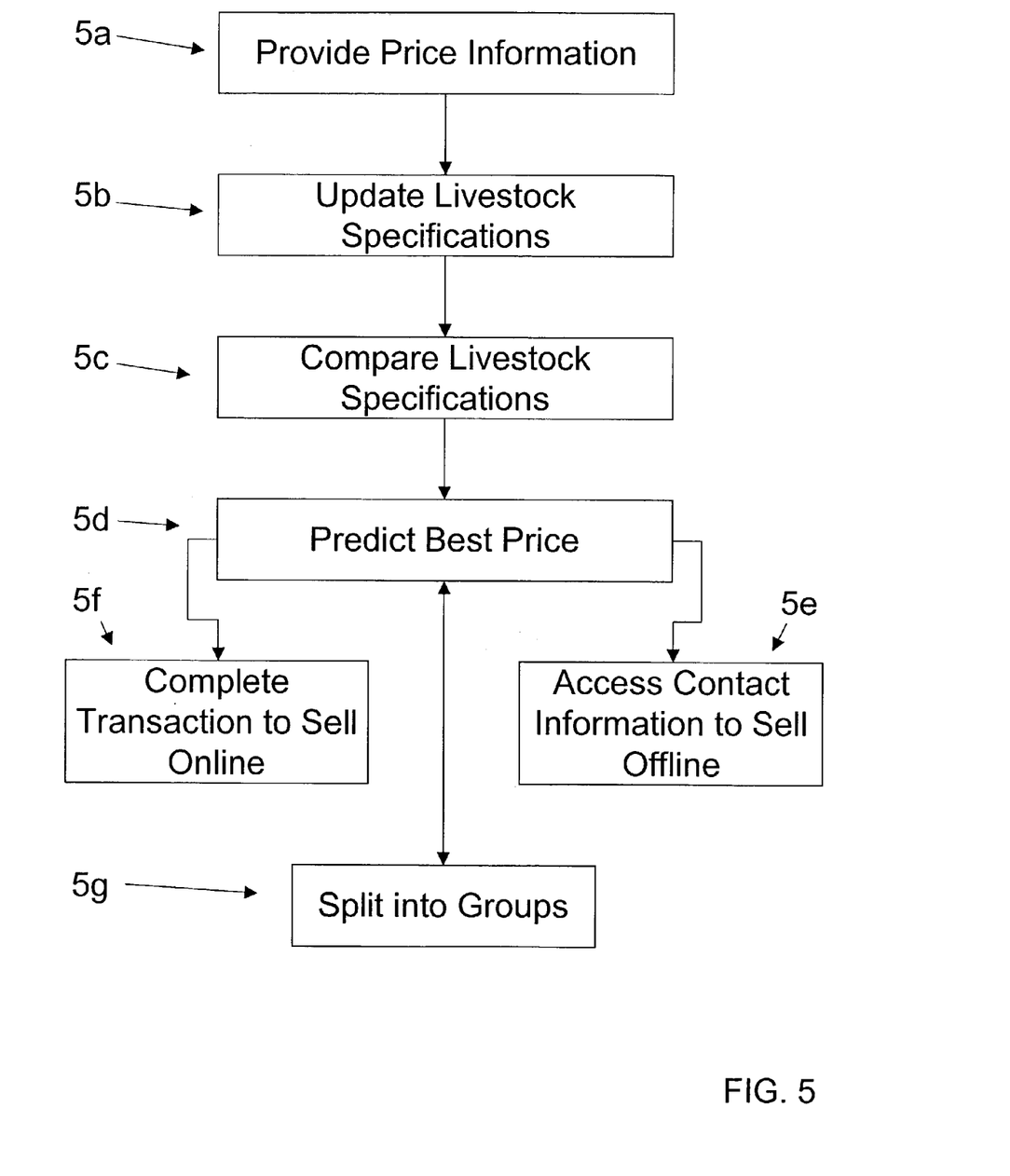
FIG. 5 is a flow chart showing a procedure for predicting a best price using the system.

The flow chart of FIG. 5 shows the functionality and operation of a preferred implementation of the present invention in more detail. In this regard, some of the blocks of the flow chart may represent a module segment or portion of code of a program of the present invention which comprises one or more executable instructions for implementing the specified logical function or functions. In some alternative implementations, the functions noted in the various blocks may occur out of the order depicted. For example, two blocks shown in succession may in fact be executed substantially concurrently, or the blocks may sometimes be executed in the reverse order depending upon the functionality involved.

In use, the buyers provide their most recent price information, which is stored in the grid database 16, as depicted in step 5a. The sellers may update the specifications stored in the livestock database 18, as depicted in step 5b. With updated specifications, any of the sellers may direct the system 10 to compare his or her specifications to the price information, as depicted in step 5c. The system 10 predicts the best price and which buyer will pay the best price for the seller's animals, as depicted in step 5d. At this point the seller may access contact information for the buyer expected to pay the best price in order to complete the transaction offline, as depicted in step 5e. Alternatively, the seller may complete the transaction online, as depicted in step 5f.

The seller also may choose to split his or her animals into two or more groups. The seller may manually decide which animal is allocated to which group, using the individual prices provided by the system 10. However, the system 10 preferably allocates the animals among the groups to produce the best price, as depicted in step 5g. For example, if the seller decided to split his or her animals into two groups, the system 10 automatically compares each individual price, by animal and by buyer, in order to find which two buyers will yield the best price for the seller's animals and which animal should be sold to each buyer. At this point the seller may complete the transaction offline or online, as described above and depicted in steps 5e and 5f.

Having thus described a preferred embodiment of the invention, what is claimed as new and desired to be protected by Letters Patent includes the following:

The invention claimed is:

1. A method of grouping animals for sale by a seller, the method comprising the steps of:
   (a) receiving for each animal from each of at least two potential buyers, the price including a base price and an adjustment to the base price dependent on a specification for the animal;
   (b) determining a maximum number of buyers to whom to sell the animals;
   (c) dividing the animals into a plurality of groups numbering less than equal to the maximum number of buyers, the dividing dependent on factors including;
   a price for each group of animals, wherein the price for each group of animals is not equivalent to a sum of the prices for all animals within a respective group;
   and a freight charge associated with shipping transporting the animal to the buyer; and
   (d) selling the animals to the buyer in the groups formed as a result of step (c).

2. The method as claimed in claim 1 wherein the specification for the animal includes a weight of the animal.

3. The method as claimed in claim 2, wherein the specification for the animal further includes a grade of the animal.

4. The method as claimed in claim 3, wherein the specification for the animal further includes a yield of the animal.

5. A method of grouping a plurality of animals for sale by a seller, the method comprising tile steps of:
   (a) receiving from at least two potential buyers a price for each of the plurality of animals;
   (b) determining a maximum number of buyers to whom to sell the animals;
   (c) automatically grouping the animals into at least two groups and not more groups than the maximum number of buyers, the grouping being dependent on a plurality of factors including;
   a price for each group of animals, a freight charge for transporting each group of animals to the buyer; and
   a preference of the seller to sell to a particular buyer;
   (d) providing any potential buyer an opportunity to change the potential buyer's price for any animal;
   (e) if the buyer's price is changed, repeating step (c) to regroup the animals into at least two groups and not more groups than the maximum number of buyers based on the plurality of factors; and
   (f) if the buyer's price is not changed, selling the animals to the buyers in the groups formed as a result of step (c).

* * * * *